United States Patent [19]
Miura et al.

[11] Patent Number: 5,556,081
[45] Date of Patent: Sep. 17, 1996

[54] SUSPENSION ARM MADE OF FIBER REINFORCED PLASTIC AND MANUFACTURING METHOD THEREOF

[75] Inventors: Morimichi Miura, Gamagouri; Tadao Oota, Okazaki, both of Japan

[73] Assignee: Toyota Jidosha Kabushiki Kaisha, Aichi-ken, Japan

[21] Appl. No.: 281,519

[22] Filed: Jul. 28, 1994

[30] Foreign Application Priority Data

Aug. 6, 1993 [JP] Japan .................................. 5-196251

[51] Int. Cl.$^6$ .................................................. B60G 7/00
[52] U.S. Cl. .............................................. 267/47; 280/688
[58] Field of Search ........................ 267/230, 44, 47, 267/271; 280/667, 669, 688, 720, 96.1, 664

[56] References Cited

U.S. PATENT DOCUMENTS

| | | | |
|---|---|---|---|
| 2,615,710 | 10/1952 | Lyman | 267/47 |
| 2,827,303 | 3/1958 | Herbenar | |
| 3,376,033 | 4/1968 | Sherwood | 267/47 |
| 3,445,911 | 5/1969 | Stamm | 267/47 |
| 3,945,625 | 3/1976 | Duchemin | 267/47 |
| 4,557,500 | 12/1985 | Collard et al. | 267/47 |
| 4,575,057 | 3/1986 | Robertson | 267/47 |
| 4,763,885 | 8/1988 | Zamitter | 267/47 |
| 4,772,044 | 9/1988 | Booher | 280/688 |
| 5,087,503 | 2/1992 | Meatto | |

FOREIGN PATENT DOCUMENTS

| | | |
|---|---|---|
| 0005916 | 12/1979 | European Pat. Off. |
| 0172050 | 2/1986 | European Pat. Off. |
| 0196351 | 10/1986 | European Pat. Off. |
| 0519130 | 12/1992 | European Pat. Off. |
| 1158894 | 6/1958 | France |
| 2656826 | 7/1991 | France |
| 2041489 | 9/1980 | United Kingdom |
| 2100835 | 1/1983 | United Kingdom |
| 2154520 | 9/1985 | United Kingdom |

OTHER PUBLICATIONS

Toyota Technical Report No. 3124, Apr. 27, 1989, pp. 49 to 50.
Patent Abstracts Of Japan, vol. 15, No. 473 (M–1185), Nov. 29, 1991: abstract for JP–A–03 203629 (Toyota) Sep. 5, 1991.
Patent Abstracts Of Japan, vol. 10, No. 368 (M–543), Dec. 9, 1986: abstract for JP–A–61 162326 (Toyota) Jul. 23, 1986.

*Primary Examiner*—Matthew C. Graham
*Attorney, Agent, or Firm*—Oliff & Berridge

[57] ABSTRACT

A suspension arm has a rigidity in the side direction of the vehicle but has a flexibility in the longitudinal direction. The suspension arm has a wheel-side connecting member connected to a portion of a wheel, at least one vehicle-side connecting member connected to a portion of a vehicle body, and an arm member extending between the wheel-side connecting member and the vehicle-side connecting member. A width of a center of the arm member is smaller than that of other portions of the arm member, the width being measured in the longitudinal direction of the vehicle, and a thickness of the center of the arm member is greater than other portions of the arm member, the thickness being measured in a vertical direction of the vehicle.

7 Claims, 8 Drawing Sheets

SUSPENSION ARM MADE OF FIBER REINFORCED PLASTIC AND MANUFACTURING METHOD THEREOF

BACKGROUND OF THE INVENTION

1. Field of the Invention

The present invention relates to a suspension arm of a vehicle, and more particularly to an A-shaped suspension arm made of fiber reinforced plastic, the suspension arm being provided between a vehicle body and a wheel.

2. Description of the Related Art

An upper arm, as a suspension arm, made of fiber reinforced plastic (FRP) is described in the TOYOTA Technical Report, April, 1989. This upper arm is adapted to connect a ball joint comprising a wheel-side connecting member connected to a wheel to a rubber bush comprising a vehicle-side connecting member connected to a vehicle body.

The above-mentioned FRP upper arm has an increased rigidity in a side direction of a vehicle without increased rigidity in a longitudinal direction of the vehicle, and thereby riding comfort and stability and controllability of the vehicle are improved. The FRP upper arm has a flat A-shaped contour so as to obtain a high strength against a load applied in the longitudinal direction. Additionally, the FRP upper arm has three different patterns of fibers incorporated therein, the fibers being wound on the ball joint, run through an arm portion and then wound on a bush portion.

However, since the above-mentioned FRP upper arm is made to be a rigid member, there is no flexibility in the longitudinal direction of the vehicle. Accordingly, in order to absorb the load applied in the longitudinal direction, a rubber bush having an elasticity has to be provided on each end of the FRP arm. The rubber bush is required to show a predetermined elastic property even after a long service time.

Additionally, because the FRP upper arm has the A-shaped contour, tensile and compression stresses due to the load applied in the longitudinal direction increase at portions of the FRP upper arm near the ball joint and the rubber bush. In order to deal with these stresses, rigidity of an entire arm has to be increased, and thus a weight of the arm is increased resulting in an increase in material costs.

A further problem is that construction of the rubber bush is complex and expensive because the rubber bush has to absorb the load in the longitudinal direction so as to provide riding comfort to the vehicle.

SUMMARY OF THE INVENTION

It is a general object of the present invention to provide an improved and useful suspension arm and manufacturing method thereof in which the above-mentioned disadvantages are eliminated.

A more specific object of the present invention is to provide a suspension arm and manufacturing method thereof, which suspension arm has a rigidity in a side direction of the vehicle but has a flexibility in a longitudinal direction.

In order to achieve the above-mentioned objects, there is provided according to one aspect of the present invention, a suspension arm provided between a body and a wheel of a vehicle, the suspension arm comprising:

a wheel-side connecting member connected to a portion of the wheel;

at least one vehicle-side connecting member connected to a portion of the vehicle body; and an arm member extending between the wheel-side connecting member and the vehicle-side connecting member, wherein a width of a center of the arm member is smaller than that of other portions of the arm member, the width being measured in a longitudinal direction of the vehicle, and a thickness of the center of the arm member is greater than other portions of the arm member, the thickness being measured in a vertical direction of the vehicle.

There is provided, according to another aspect of the present invention, a manufacturing method of a suspension arm provided between a body and a wheel of a vehicle, the suspension arm comprising a wheel-side connecting member connected to a portion of the wheel, a vehicle-side connecting member connected to a portion of the vehicle body and an arm member extending between the wheel-side connecting member and the vehicle-side connecting member, the manufacturing method comprising the steps of:

a) preparing a fiber strand wound on the wheel-side connecting member, the fiber strand extending from the wheel-side connecting member having a predetermined length, the fiber strand being impregnated with resin;

b) placing the fiber strand in a groove formed on a lower forming die, the groove having a shape corresponding to the suspension arm;

c) pressing the fiber strand into the groove by using a roller, the roller being moved along the fiber strand toward an extreme end of the fiber strand from the wheel-side connecting member;

d) winding the extreme end of the fiber strand on the vehicle-side connecting member;

e) placing an upper forming die on the lower forming die so that the fiber strand including the wheel-side connecting member and the vehicle-side connecting member fits in the groove formed on the lower forming die; and f) curing the resin by applying heat to the fiber strand.

There is provided, according to another aspect of the present invention, a manufacturing method of a suspension arm provided between a body and a wheel of a vehicle, the suspension arm comprising a wheel-side connecting member connected to a portion of the wheel, a vehicle-side connecting member connected to a portion of the vehicle body and an arm member extending between the wheel-side connecting member and the vehicle-side connecting member, the manufacturing method comprising the steps of:

a) preparing a jig including a first jig, a second jig and a third jig, the first jig having a recess corresponding to a shape of the wheel-side connecting member, the second jig having fixing means for fixing the vehicle-side connecting member, the third jig having a gap having a width corresponding to a width of a center portion of the arm member, the width being measured in a longitudinal direction of the vehicle;

b) arranging the first, second and third jigs so that the jigs are arranged corresponding to a shape of the suspension arm;

c) placing the wheel-side connecting member in the recess of the first jig, and fixing the vehicle-side connecting member to the second jig; and d) winding a fiber strand on the wheel-side connecting member and the vehicle-side connecting member by passing through the gap of the third jig, the fiber strand being impregnated with resin; and e) curing the resin by applying heat.

Other objects, features and advantages of the present invention will become more apparent from the following detailed description when read in accordance with the accompanying drawings.

DETAILED DESCRIPTION OF THE PREFERRED EMBODIMENTS

Figure 1:
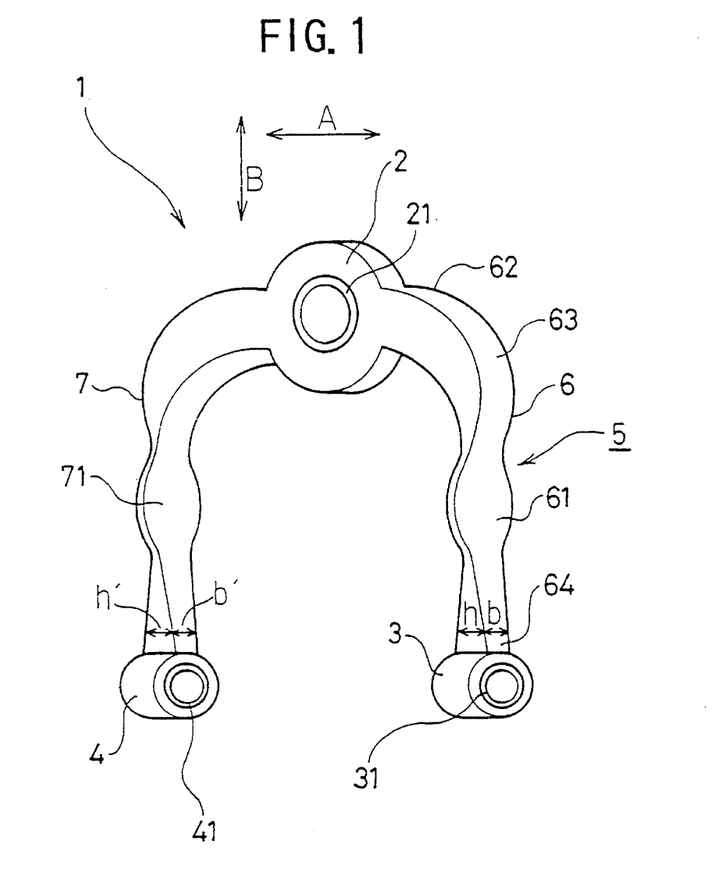
FIG. 1 is a perspective view of an embodiment of an upper arm according to the present invention.

A description will now be given of an embodiment of a suspension arm according to the present invention. FIG. 1 shows an embodiment of an upper arm 1 according to the present invention. The upper arm 1 shown in FIG. 1 is an A-shaped upper arm used in a double-wishbone type suspension.

The upper arm 1 comprises a ball joint 2, bushes 3 and 4, and an arm 5 connecting each of the bushes 3 and 4 to the ball joint 2. The ball joint 2 corresponds to the above-mentioned wheel-side connecting member, and has a plastic sleeve 21. Each of the bushes 3 and 4 corresponds to the above-mentioned vehicle-side connecting member, and has plastic sleeves 31 and 41, respectively. The arm 5 is made of glass fiber reinforced plastic (GFRP), and comprises arm portions 6 and 7. The arm portion 6 extends between the bush 3 and the ball joint 2, and the arm portion 7 extending between the bush 4 and the ball joint 2.

The arm portion 6 has a flat center portion 61 having a relatively wide width. A width b (b') of the arm portion 6 between the bush 3 and the center portion 61 gradually increases toward the center portion 61, while a thickness h (h') gradually decreases, the width b being measured in a vertical direction of a vehicle, the thickness h being measured in a longitudinal direction of the vehicle. (arrow A represents the longitudinal or front to rear direction of the vehicle and arrow B represents the side-to-side direction of the vehicle.

Figure 2:
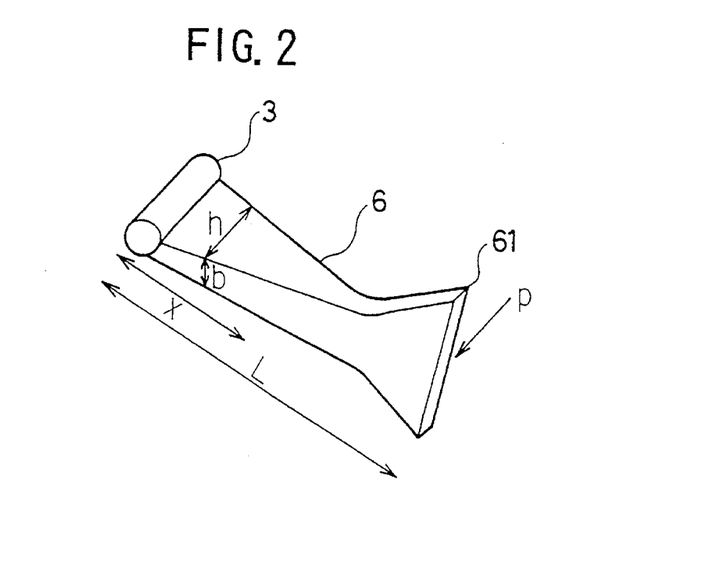
FIG. 2 is an illustration for explaining a determination of a shape of the arm shown in FIG. 1.

The shape of the arm portion 6, that is the width b and the thickness h of the arm portion 6, is determined according to the following expression (1) so that a cross sectional area A of the arm portion is constant as shown in FIG. 2.

$$A = b \times h \quad (1)$$

Additionally, the width b and the thickness h are respectively determined according to the following expression (2) so that a bending stress, generated due to a load P (refer to FIG. 2), at each point of the arm portion 6 along an extending direction of the arm portion 6 is constant.

$$\sigma = M/Z = P(L-x)/(bh^2/6) \quad (2)$$

where M is a moment;
Z is a modulus of section;
L is a length of the arm portion between the bush 3 and the center portion 61; and
x is a distance from the bush 3 to an arbitrary point of the arm portion 6.

Additionally, the width b and the thickness h are determined according to the following expression (4) so that the arm 5 can absorb the bending stress generated due to the load P applied in a longitudinal direction. The expression (4) is obtained by twice integrating the result obtained by entering the expressions (1) and (2) into the following expression (3) representing a deflection of the arm portion 6.

$$d^2y/dx^2 = M/EI = P(L-x)/(Ebh^3/12) \quad (3)$$

where E is Young's modulus; and
I is a geometrical moment of inertia.

$$y = A\sigma^2[(x-L) \{lnL - ln(L-x)\} + x]/3EP \quad (4)$$

where y is an amount of the deflection.

Further, the width b and the thickness h are determined to satisfy the following expressions (5), respectively.

$$b \geq 2 \text{ mm}, h \leq 100 \text{ mm} \quad (5)$$

It should be noted that the above expressions (5) are applied to maintain the width b being greater than 2 mm because if the width b (or the thickness h) is less than 2 mm, there may occur a problem associated with GFRP. That is, if the width b is less than 2 mm, the arm portion 6 may become cracked or deformed because the arm portion 6 is made of GFRP. Additionally, the arm portion 6 may not have a sufficient strength against fatigue and vibrations.

According to the shape of the arm portion 6 as shown in FIG. 1 and determined by the above-mentioned expressions (1) through (5), a portion 62 of the arm portion 6 near the ball joint 2 has a sufficient rigidity in a side direction as well as in the longitudinal direction. In a portion 63 near the center portion 61, flexibility in the longitudinal direction is increased. In the center portion 61, the arm portion 6 is flexible in the longitudinal direction but not flexible in the side direction. Further, in a portion 64 near the bush 3, rigidity in the longitudinal direction increases and flexibility in the side direction increases toward the bush 3.

It should be noted that, similarly to the arm portion 6, the arm portion 7 has a center portion 71, and a width b' and a thickness h' correspond to the width b and the thickness h of the arm portion 6, respectively.

When the load P in the longitudinal direction is applied to the upper arm 1, uniform bending stresses are generated over the arm 5 because the arm 5 is formed by a uniform stress design according to the above-mentioned expression (2). The arm portions 6 and 7 are formed so as to be flexible in the longitudinal direction, and thus the bending stress is absorbed by the deflection of the arm portions 6 and 7. Accordingly, no bending stress is concentrated in the ball joint 2 or the bushes 3 and 4, and thus an elastic function to absorb the load P in the longitudinal direction required for the ball joint 2 and the bushes 3 and 4 is no longer needed. Therefore, a manufacturing cost incurred by using a rubber member provided to the bushes 3 and 4 can be eliminated.

Because the longitudinal load P can be absorbed by the deflection of the arm portions 6 and 7, a vibration in the longitudinal direction is not transmitted to a driver of the vehicle, and thus good riding comfort can be maintained.

When a side load is applied to the upper arm 1, the arm portions 6 and 7 hardly deflect because the arm portions 6 and 7 are not flexible in that direction, and thus a wheel alignment is not changed. Accordingly, good stability and controllability of the vehicle is obtained.

Figure 3:
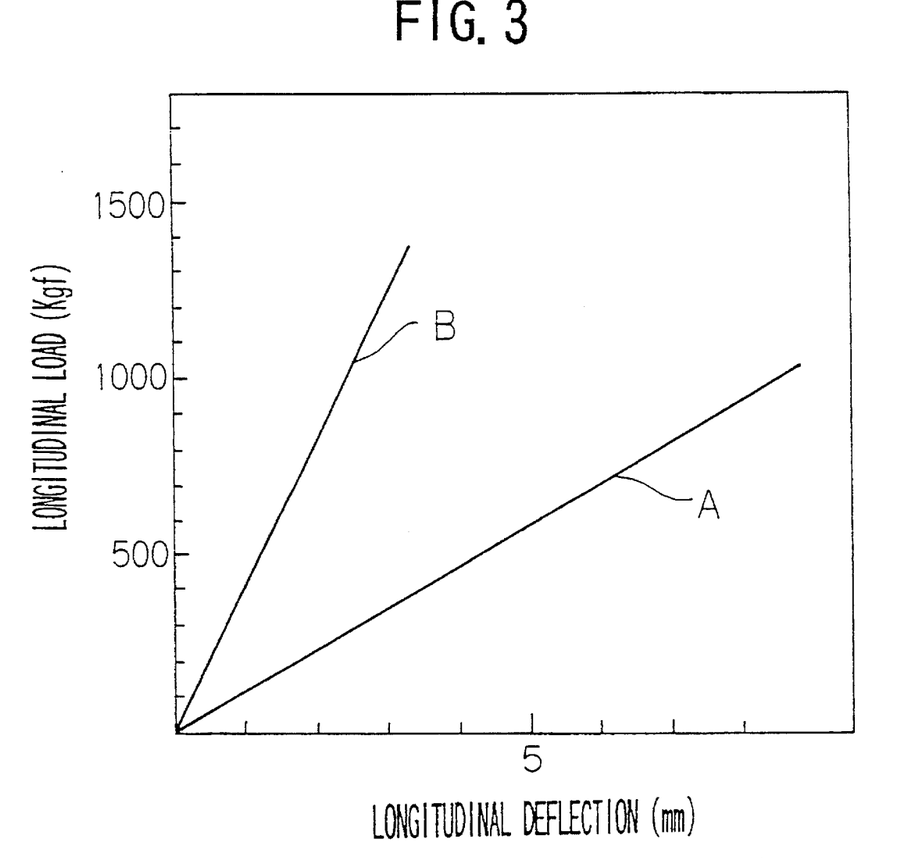
FIG. 3 is a graph showing an elastic property of a rubber bush for a load applied in a longitudinal direction.

Additionally, because no rubber member is necessary for the upper arm 1 of the present embodiment, a problem which may occur due to aging of the rubber member is also eliminated. An elastic property of a rubber member provided to bushes of a conventional upper arm varies, from A to B shown in FIG. 3, during a long service life due to aging and excessive forces exerted on the rubber member. That is, the rubber member is hardened after the long service life, and thus an effect of absorbing vibrations is lowered which condition results in deterioration of riding comfort. However, using the upper arm according to the present embodiment, there is no need to use the rubber member because the arm itself has a flexibility in the longitudinal direction, and thus the above-mentioned problem can be eliminated.

The upper arm of the present embodiment according to the present invention is formed so that a uniform stress, which does not exceeds upper stress limit of an elastic range, is generated, and thus there is no permanent deformation of the arm portions 6 and 7 due to repeated stresses. This allows good riding comfort maintained over a long service period as well as a decreased possibility of cracking of the arm portions 6 and 7. Further, due to the uniform stress design of the arm 5, the upper arm can be light weight and compact.

Figure 4A:
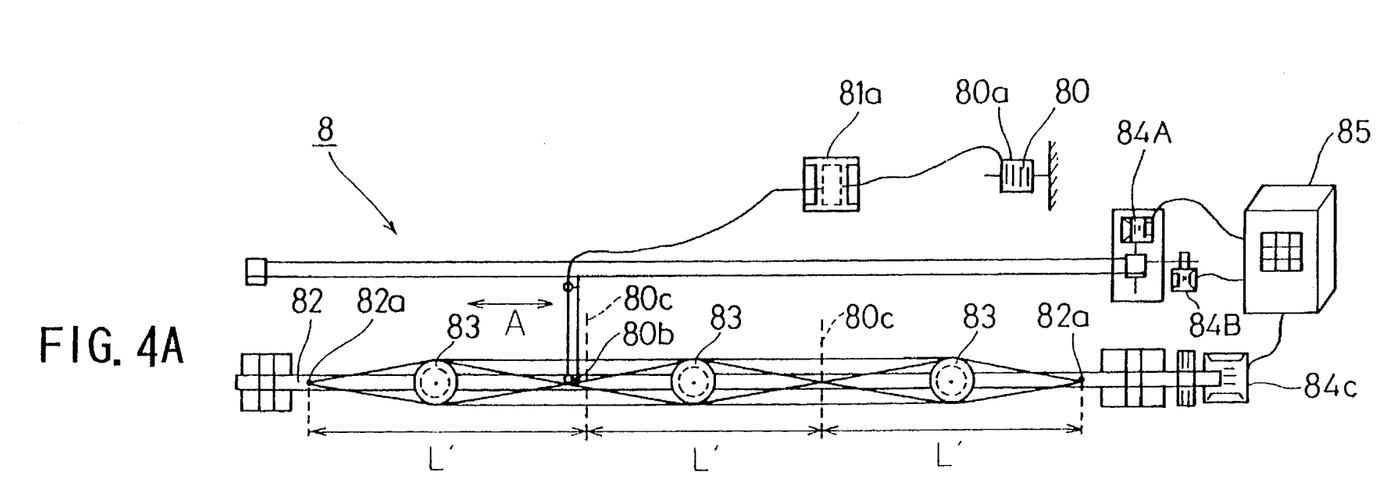
FIG. 4A is a plan view of a filament winding machine used for manufacturing the upper arm shown in FIG. 1.
Figure 4B:
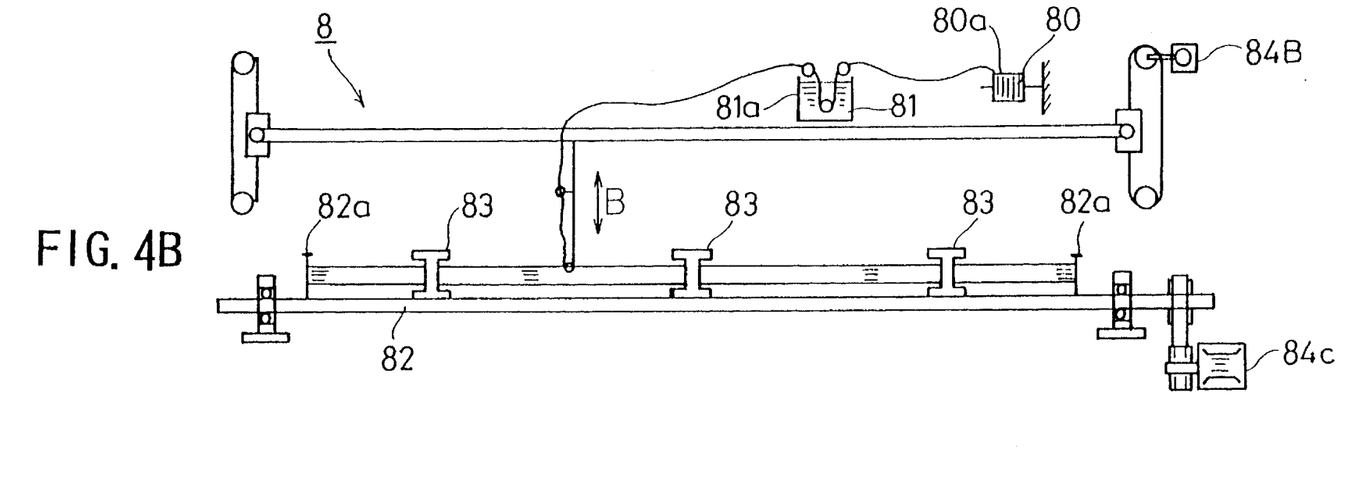
FIG. 4B is a side view of the filament winding machine shown in FIG. 4A.

A description will now be given of a first embodiment of a manufacturing method of the above-mentioned upper arm 1. FIGS. 4A and 4B show a filament winding (FW) machine 8 used for winding filament (glass fibers) of the upper arm 1.

The filament winding machine 8 is capable of winding three upper arms at the same time. The filament winding machine 8 comprises a fiber role 80a supplying glass fiber strand 80, a vessel 81a storing epoxy resin 81, a table 82 on which the glass fiber strand 80 is wound in a predetermined shape, motors 84A, 84B and 84C and a controller 85 controlling the motors 84A, 84B and 84C.

The table 82 is provided with a guide member on either end so as to make the glass fiber strand 80 U-turn at the ends of the table 82. Three plastic rings 83 of ball joints are placed on the table 82 between the guide members. The motor 84A is provided for moving an end 80b of the glass fiber strand 80 in a longitudinal direction (shown by an arrow A in FIG. 4a) of the table 82. The motor 84B is provided for moving the end 80b of the glass fiber strand 80 in a direction (shown by an arrow B in FIG. 4B) perpendicular to a surface of the table 82. The motor 84C is provided for rotating and moving the plastic rings 83 in the direction perpendicular to the surface of the table 82.

In the above-mentioned filament winding machine 8, the glass fiber strand 80 is first passed through the vessel 81a so as to impregnate the epoxy resin 81 into the glass fiber strand 80. The end 80b of the glass fiber strand 80 is moved by means of the motors 84A and 84B so that the glass fiber strand 80 is wound on each of the plastic rings 83. At this time the plastic rings 83 are rotated and moved up and down so that the glass fiber strand 80 is wound on each of the plastic rings 83 in a predetermined condition.

After a predetermined number of windings have formed, the continuous glass fiber strand 80 is cut at positions 80c shown in FIG. 4A so as to separate the glass fiber strand 80 into 3 portions, each of the portions comprising a single plastic ring 83. Each of the portions of the glass fiber strand 80 has an equal length L' as shown in FIG. 4A, and has the plastic ring 83 in the center thereof.

Figure 5A:
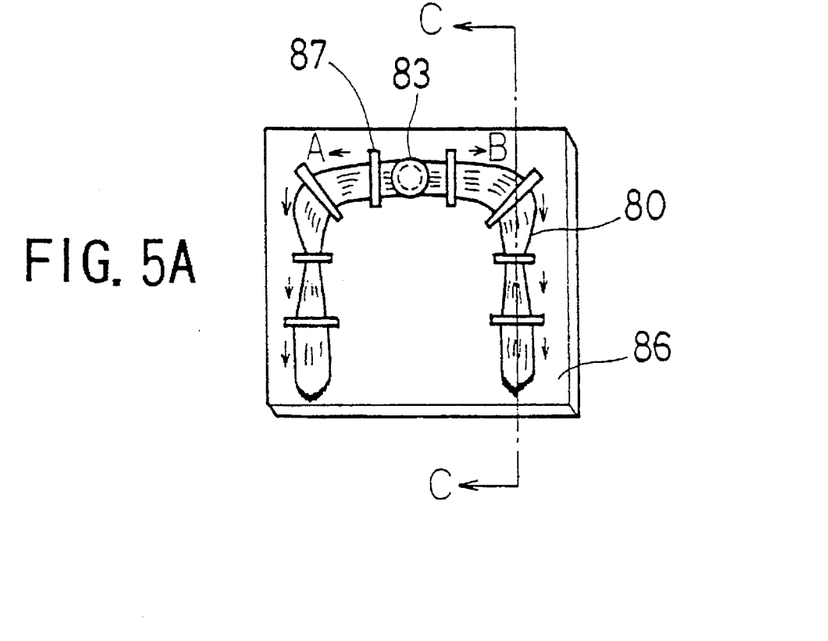
FIG. 5A is a plane view of a lower forming die on which a glass fiber strand wound by the filament winding machine shown in FIGS. 4A and 4B is placed.
Figure 5B:
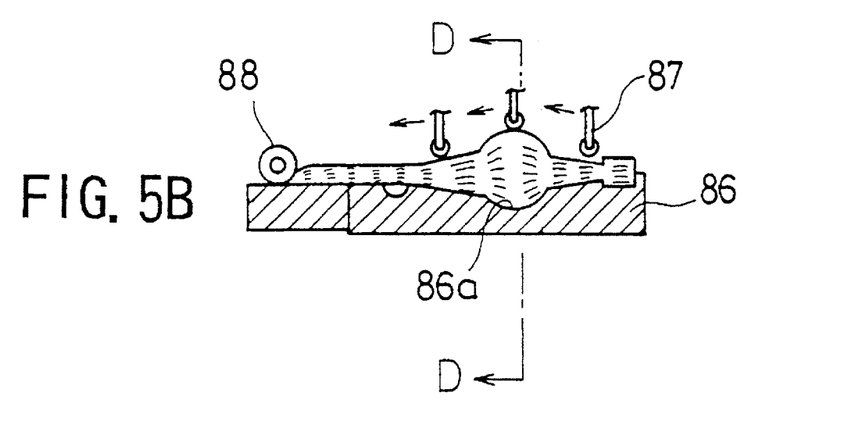
FIG. 5B is a cross sectional view taken along a line C—C of FIG. 5A.
Figure 5C:
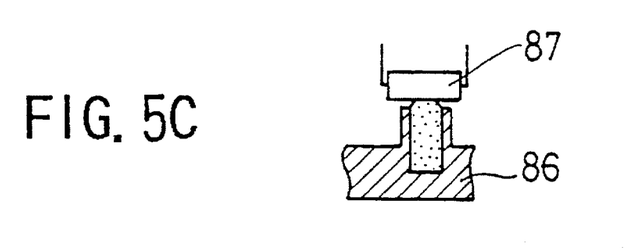
FIG. 5C is a cross sectional view taken along a line D—D of FIG. 5B.

Each of the portions of the glass fiber strand 80 is placed on a lower forming die 86 having a groove 86a formed in a predetermined shape as shown in FIGS. 5A and 5B. The portion of the glass fiber strand 80 is then pressed into the groove 86a formed on the forming die 86 by means of a roller 87. At this time, the roller 87 is moved from the plastic ring 83 to an extreme end of the portion of the portions of the glass fiber strand 80 as shown by arrows A and B in FIG. 5A. The movement of the roller 87 is also shown in FIG. 5B which shows a cross sectional view taken along a line C—C of FIG. 5A. FIG. 5C is a cross sectional view taken along a line D—D of FIG. 5B.

Figure 6A:
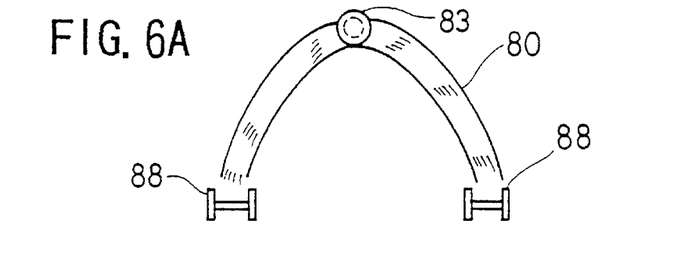
FIG. 6A is an illustration for explaining a positional relationship between the wound glass fiber strand and plastic rings used as bushes.
Figure 6B:
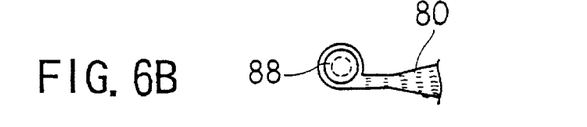
FIG. 6B is an illustration showing a treatment of an end of the glass fiber strand.
Figure 6C:
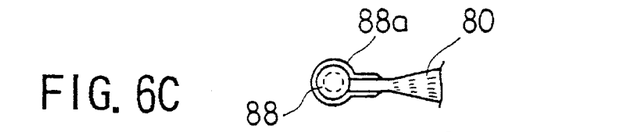
FIG. 6C is an illustration showing a treatment of an end of the glass fiber strand.
Figure 6D:
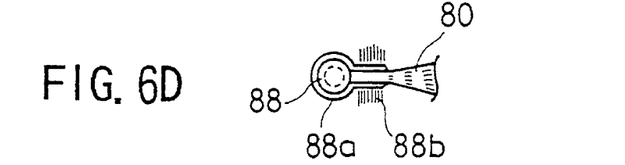
FIG. 6D is an illustration showing a treatment of an end of the glass fiber strand.

After portion of the glass fiber strand 80 is pressed into the groove 86a, each end of the portion of the glass fiber strand 80 is wound on a plastic ring 88 used as a bush as shown in FIGS. 6A and 6B. An FRP stopper 88a is fitted over the plastic ring 88 as shown in FIG. 6C, and then an FRP fastener 88b is applied as shown in FIG. 6D so as to fasten the portion of the glass fiber strand 80 over the plastic ring 88.

Figure 7A:
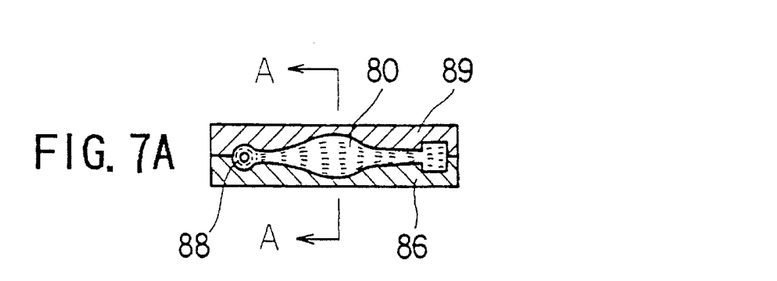
FIG. 7A is an illustration showing the lower forming die and an upper forming die in a closed position.
Figure 7B:
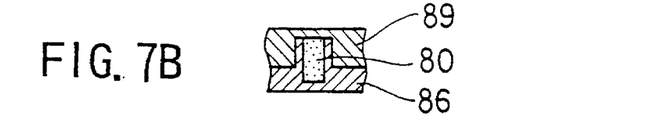
FIG. 7B is a cross sectional view taken along a line A—A of FIG. 7A.

The plastic ring 88 used as the bush is then placed into the forming die 86, and an upper forming die 89 is placed on the lower forming die 86 as shown in FIG. 7A. The portion of the glass fiber strand 80 is enclosed in a cavity formed by the lower forming die 86 and the upper forming die 89 as shown in FIG. 7B which shows a cross sectional view taken along a line A—A of FIG. 7A.

The portion of the glass fiber strand 80 is then heated for 60 min. at 120° C. so as to cure the epoxy resin impregnated in the glass fiber strand 80. By this process, the portion of the glass fiber strand 80 is formed into the upper arm 1 having a predetermined shape determined by the forming dies 86 and 89.

In the above-mentioned embodiment of the manufacturing method according to the present invention, the upper arm 1 is formed by pressing the portion of the glass fiber strand 80 into the groove 86a of the lower forming die 86 by using a roller 87, and thus the upper arm 1 can be manufactured in a simple process.

Figure 8:
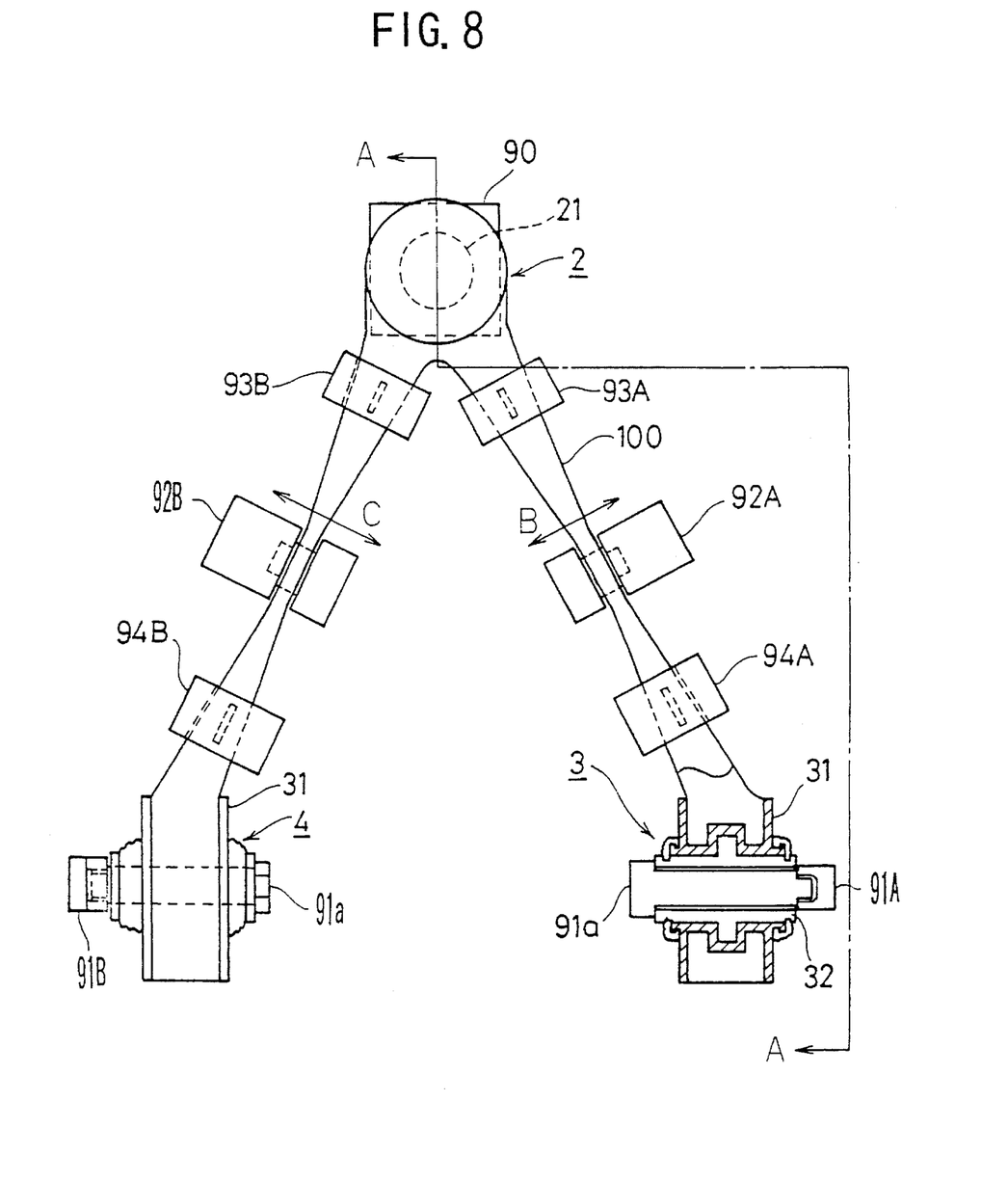
FIG. 8 is a plan view of a layout of a plurality of jigs used for forming the upper arm shown in FIG. 1.
Figure 9:
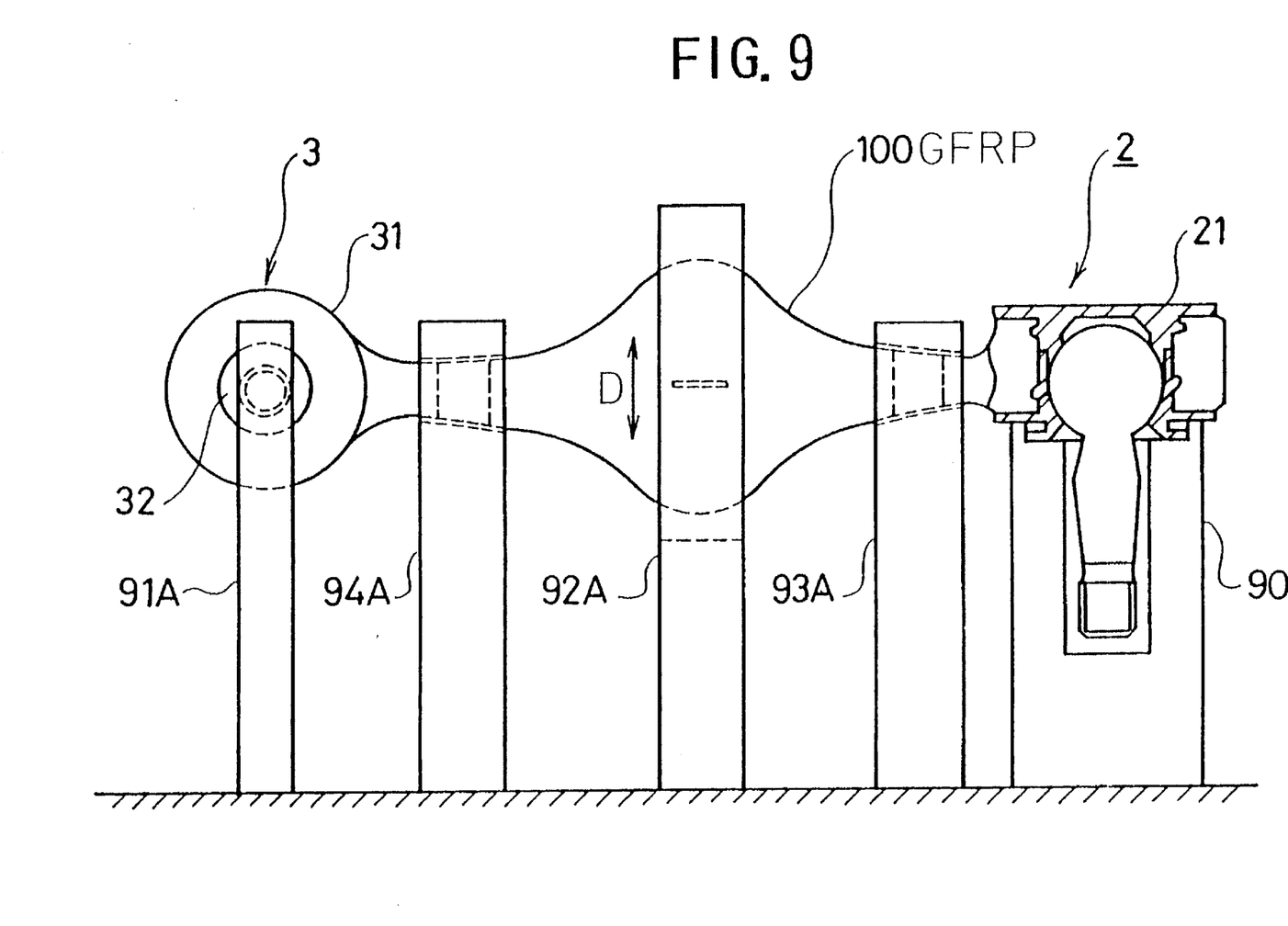
FIG. 9 is a view taken along a line A—A of FIG. 8.

A description will now be given, with reference to FIGS. 8 through 10E, of a second embodiment of a manufacturing method of the upper arm 1. In this embodiment, the upper arm 1 is manufactured by using a plurality of jigs 90, 91A(B), 92A(B), 93(B)A and 94A(B) adapted to hold each portion of the upper arm 1. FIGS. 8 and 9 show an entire layout of the jigs; FIG. 8 is a plan view; FIG. 9 is a view taken along a line A—A of FIG. 8. In FIGS. 8 and 9, for the sake of easy understanding, the complete upper arm 1 is illustrated.

Figure 10A:
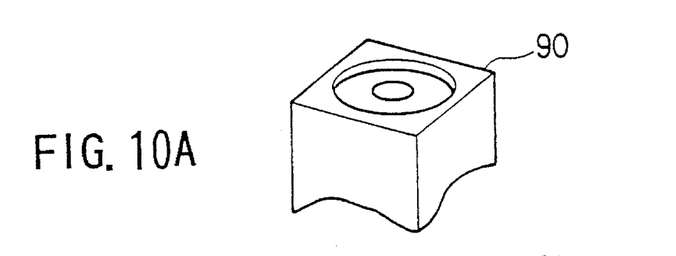
FIG. 10A, 10B, 10C, 10D and 10E are partial perspective views of the jigs shown in FIG. 8.
Figure 10B:
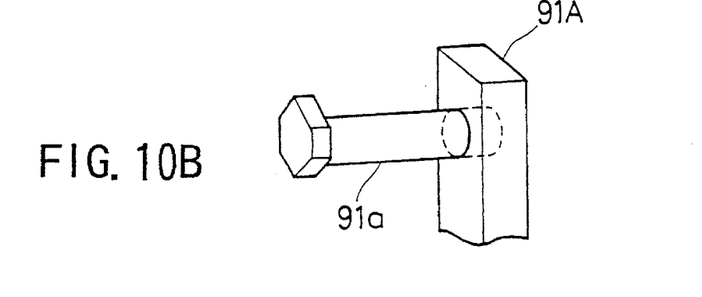

In this second embodiment of a manufacturing method according to the present invention, the ball joint 2 is placed on the jig 90 in which a recess corresponding to a shape of the ball joint 2 is formed as shown in FIG. 10A. The bush 3 is fixed to the jig 91A by a bolt 91a as shown in FIGS. 8 and 10B. The bush 4 is fixed, similarly to the bush 3, to the jig 91B. It should be noted that the jigs 90, 91A and 91B are arranged in predetermined positions, so that the ball joint 2 and the bushes 3 and 4 are positioned the same as that of the complete upper arm 1.

Figure 10C:
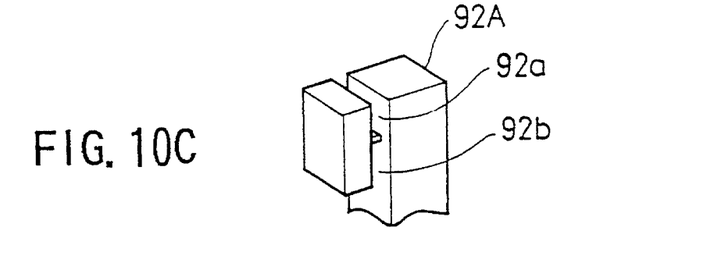

Additionally, the jig 92A is arranged between the jig 90 and the jig 91A, and the jig 92B is arranged between the jig 90 and the jig 91B. Each of the jigs 92A and 92B has gaps 92a and 92b as shown in FIG. 10C, the gaps 92a and 92b being arranged vertically. The gaps 92a and 92b have widths corresponding to the center portion 61 of the upper arm 1.

Figure 10D:
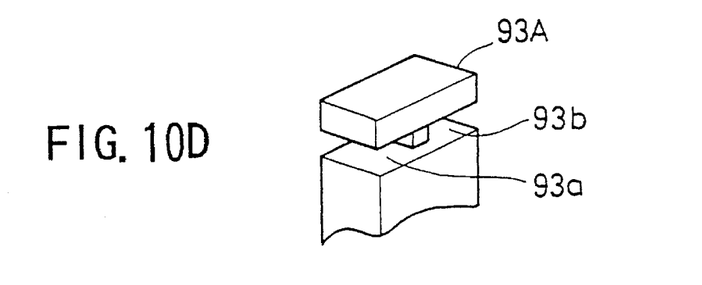
Figure 10E:
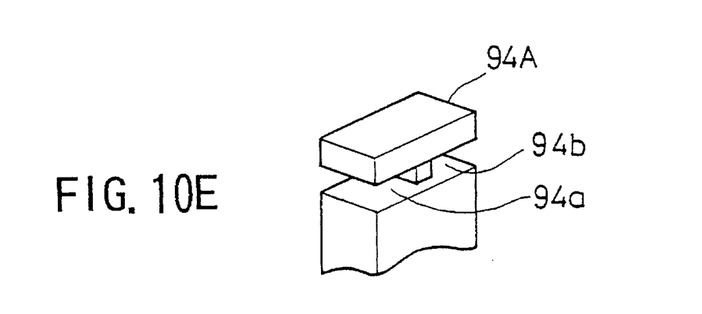

The jig 93A is arranged near the jig 90 between the jig 90 and the jig 92A, the jig 93A having gaps 93a and 93b arranged horizontally as shown in FIG. 10D. The gaps 93a and 93b have widths corresponding to a corresponding portion of the upper arm 1. The jig 94A is arranged near the jig 91A between the jig 90 and the jig 91A, the jig 94A having gaps 94a and 94b arranged horizontally as shown in FIG. 10E. The gaps 94a and 94b have widths corresponding to a corresponding portion of the upper arm 1.

The jig 93B is arranged near the jig 90 between the jig 90 and the jig 92B, the jig 93B having gaps similar to the gaps 93a and 93b of the jig 93B. The jig 94B is arranged near the jig 91B between the jig 90 and the jig 91B, the jig 94B having gaps similar to the gaps 94a and 94b of the jig 94A.

After placing the ball joint 2 on the jig 90 and fixing the bushes 3 and 4 to the jigs 91A and 91B, respectively, a glass fiber strand 100 impregnated with resin is wound on the plastic sleeve 21 of the ball joint 2, and then the glass fiber strand 100 is passed through the gap 93a of the jig 93A, the gap 92a of the jig 92A, and the gap 94a of the jig 94A, in that order, and then the glass fiber strand 100 is wound on the plastic sleeve 31 of the bush 3. After being wound on the plastic sleeve 31, the glass fiber strand is passed through the gap 94b of the jig 94A, the gap 92b of the jig 92A, and the gap 93b of the jig 93A, in this turn, and then the glass fiber strand is wound on the plastic sleeve 21 of the ball joint 2. After the glass fiber strand is wound on the plastic sleeve 21 for the second time, the same process is performed for the other side of the arm formed with the jigs 93B, 92B, 94B and 91B.

The above-mentioned strand winding process is repeated a predetermined number of times, resulting in formation of the upper arm 1 having a predetermined shape. That is, the shape of the glass fiber strand winding formed by the present embodiment of the manufacturing method has a narrow width at positions corresponding to the jigs 92A and 92B in directions indicated by arrows B and C, respectively. Additionally, widths corresponding to the jigs 93A, 93B, 94A and 94B are wide relative to the width of portions corresponding to the jigs 92A and 92B.

According to the second embodiment of the present invention, the upper arm 1 having a varying cross section can be easily formed by using a plurality of jigs in the glass fiber strand winding process, without altering a winding process of a manufacturing method of a conventional upper arm.

The present invention is not limited to the specifically disclose embodiments, and variations and modifications may be made without departing from the scope of the present invention.

What is claimed is:

1. A suspension arm provided between a body and a wheel of a vehicle, the suspension arm comprising:

a wheel-side connecting member connected to a portion of the wheel;

at least one vehicle-side connecting member connected to a portion of the vehicle body; and at least one an arm member corresponding to the at least one vehicle-side connecting member and extending between said wheel-side connecting member and said vehicle-side connecting member, wherein a width of a center of said arm member is smaller than that of other portions of said arm member that are adjacent the at least one vehicle-side connecting member and the wheel-side connecting member, said width being measured in a longitudinal direction of the vehicle, and a thickness of the center of said arm member is greater than other portions of said arm member that are adjacent the at least one vehicle-side connecting member and the wheel-side connecting member, said thickness being measured in a vertical direction of said vehicle.

2. The suspension arm as claimed in claim 1, wherein the width of said arm member gradually decreases and the thickness of said arm member gradually increases toward the center from said wheel-side connecting member and from said vehicle-side connecting member.

3. The suspension arm as claimed in claim 2, wherein the width and the thickness of said arm member are determined according to a relationship between a deflection of said arm member and a predetermined load being applied to said arm member in the longitudinal direction so that the deflection does not exceed a predetermined amount when a maximum load is applied to said arm member in the longitudinal direction.

4. The suspension arm as claimed in claim 3, wherein the width and the thickness of said arm member are determined so that uniform bending stress is generated in said arm member when a load is applied to said arm member in the longitudinal direction.

5. The suspension arm as claimed in claim 4, wherein two vehicle-side connecting members and first and second arm members are provided, and said first arm member extends between one of said vehicle-side connecting members and said wheel-side connecting member and said second arm member extends between the other of said vehicle-side connecting members and said wheel-side connecting member, said first arm member being the same shape as said second arm member.

6. The suspension arm as claimed in claim 5, wherein said first arm member and said second arm member are made of fiber reinforced plastic.

7. The suspension arm as claimed in claim 5, wherein a cross sectional area of each of said first arm member and said second arm member is constant in a direction normal to the longitudinal direction of each of said first arm member and said second arm member.

* * * * *